United States Patent Office 2,820,192
Patented Jan. 14, 1958

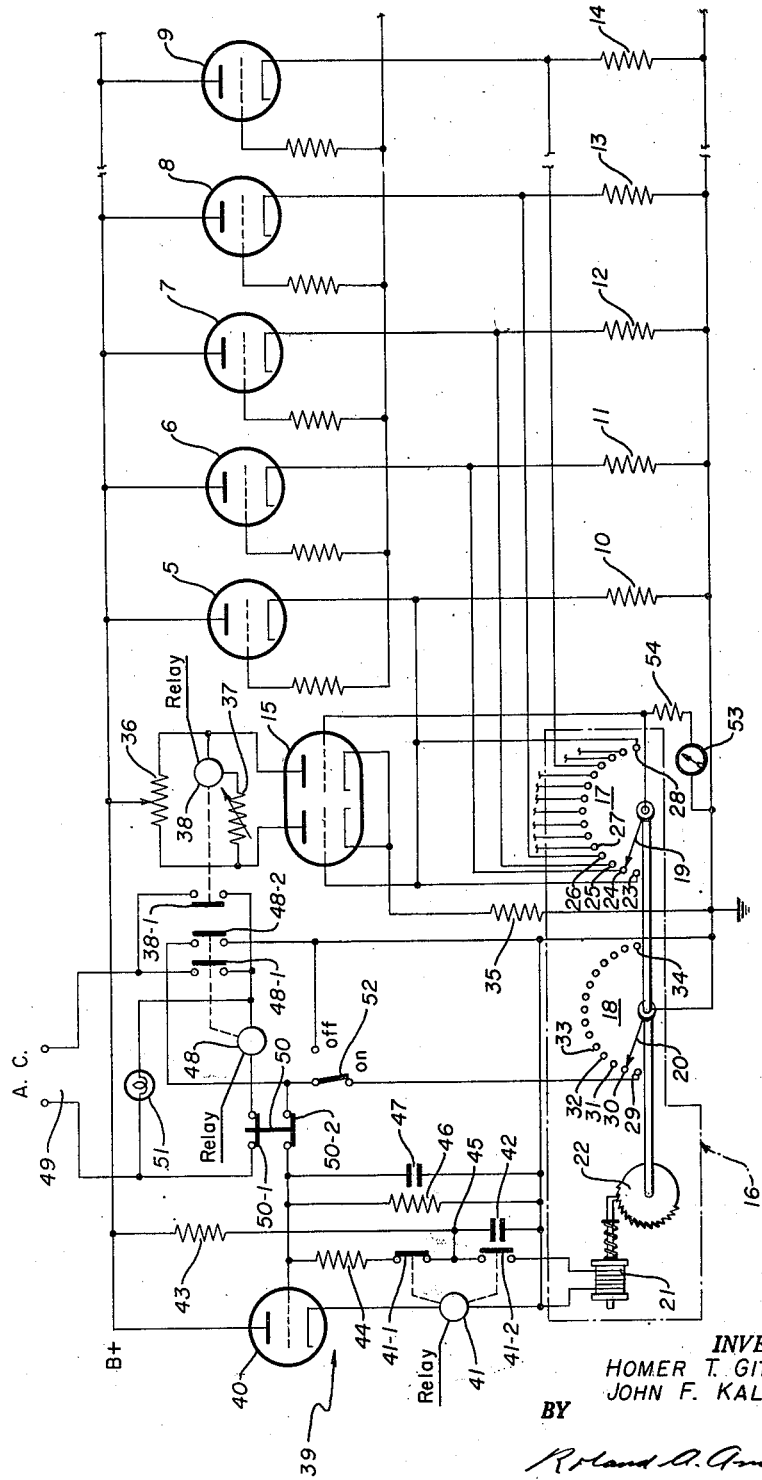

2,820,192

TUBE TESTER

Homer T. Gittings, Jr., Los Alamos, N. Mex., and John F. Kalbach, Altadena, Calif., assignors to the United States of America as represented by the United States Atomic Energy Commission Application June 29, 1956, Serial No. 595,037

8 Claims. (Cl. 324—25)

This invention relates to apparatus for comparing each one of a series of vacuum tubes with a standard tube and thereby determining the relative operating condition of the former. More particularly, an automatic apparatus is provided for the periodic testing of a number of vacuum tubes while in service and as frequently as may be desired.

In electronic equipment utilizing a large number of vacuum tubes, it is desirable to anticipate possible tube failure prior to its occurrence; this is particularly important when the equipment is in continuous service and shut down, due to a defective tube or for the purpose of inspection, is to be avoided. The device of the present invention meets the foregoing conditions and possesses in addition other advantageous features enabling a complete series of vacuum tubes to be quickly tested by comparison with a standard vacuum tube.

Accordingly, it is a principal object of the invention to provide a tube testing apparatus for comparing a tube in service with a standard tube.

Another object is to provide a tube tester which will compare each one of a series of tubes in service with a standard tube and give automatic indication when a defective tube is located.

A further object of the invention is to provide a tube tester of the character described which will compare sequentially and at a continuous cyclic rate each one of a series of tubes in service with a standard tube and cease operation upon locating a defective tube.

Other objects and advantages will be apparent as the description proceeds.

The invention will be more clearly understood from the following description together with the accompanying drawing in which the single figure shows the invention in schematic form.

In its broadest aspects the tube tester of the present invention compares a particular tube with a standard tube through a difference amplifier. An unbalanced condition in the circuit of the latter produced by excessive deviation of the particular tube in its characteristics from standard actuates a switch mechanism stopping the testing cycle and indicating the defective tube.

More particularly, referring to the drawing, there is shown a standard tube 5, e. g., a triode, connected in parallel with each of a series of tubes to be tested. Such series of tubes designated 6, 7, 8, 9 are identical in type to standard tube 5, and all the tubes are equally biased. The anodes of standard tube 5 and tubes 6, 7, 8, 9 are connected to a D. C. source designated B+ while the cathodes are each connected to ground through identical load resistors 10, 11, 12, 13, 14, respectively.

A difference amplifier tube 15 which may be of the high-mu double triode type 6SL7 or 6SU7 is provided to compare the plate currents of each of the series of tubes 6, 7, 8, 9 with standard tube 5 and generate an output signal when a defective tube is located for inactivating the tube tester of the invention as described hereinafter. The cathode of standard tube 5 is connected to the left hand control grid of double triode 15 and the cathodes of tubes 6, 7, 8, 9 are sequentially connected to the right hand control grid of double triode 15 by a stepping switch 16.

Stepping switch 16 includes two electrically independent first and second contact decks 17 and 18 provided with mechanically coupled rotating switch arms 19 and 20 actuated by a solenoid 21 through a stepper 22. First contact deck 17 includes switch arm 19 and a series of terminals 23, 24, 25, 26, 27 and remotely located terminal 28 while second contact deck 18 includes switch arm 20 and a corresponding series of terminals 29, 30, 31, 32, 33, . . . 34. Switch arm 20 is also coupled to ground. The cathodes of the series of tubes 6, 7, 8, 9 are connected in sequence to terminals 24, 25, 26, 27 of deck 17 while the identification of tubes 6, 7, 8, 9 are indicated by the corresponding terminals 30, 31, 32, 34 of deck 18 which is visual to an observed.

The left hand control grid of double triode 15 is connected to the first terminal 23 and remotely separate terminal 28 of deck 17 while the right hand control grid is connected to switch arm 19 of deck 17. The cathodes of double triode 15 are connected through a load resistor 35 to ground. Bridging the anodes of double triode 15 is a resistor 36, a variable tap therefrom connecting with B+ and being so adjusted that said anodes are at equal potential. Also connected across the anodes of double triode 15 is a resistor 37 in series with a sensitive relay coil 38 having a normally open contactor 38–1. Resistor 37 provides means for adjusting the sensitivity of relay coil 38 and thereby the permitted deviation from standard of the characteristic of the tube being tested. Should a tube undergoing test, as tube 6 for example, be defective a voltage having an abnormal value will be applied to the right hand control grid of double triode 15 through switch arm 19 contacting terminal 24 of deck 17, the output circuit of double triode 15 will become unbalanced, thus drawing current through relay coil 38 and causing it to actuate contactor 38–1 and thereby operate switch mechanism later to be described. A more complete description of the function of a difference amplifier such as herein provided by double triode 15 is to be found on pages 53, 54 of Electronics, by Elmore and Sands, National Nuclear Energy Series, vol. 1, McGraw-Hill.

Operation of relay coil 38 as stated serves to operate associated switch mechanism stopping the mechanically coupled rotating switch arms 19 and 20 of stepping switch 16 on the terminals corresponding to the defective tube; whereas, in the absence of a defective tube, testing of the sequence of tubes 6, 7, 8, 9, etc. proceeds in order and automatically through the last tube of the series as described below.

Actuation of stepping switch 16 at a continuous cyclic rate is provided by a relaxation oscillator 39 coupled to stepping switch solenoid 21. Therefore when the tube being tested, as tube 6 for example, operates within the standard deviation set by resistor 37, difference amplifier 15 is in balance and switch arms 18, 19 positioned on deck terminals 24 and 30 respectively while tube 6 is being tested, are rotated to the next terminals of decks 17 and 18, respectively, by stepper 22 the instant relaxation oscillator 39 delivers a pulse to stepping switch solenoid 21.

Relaxation oscillator 39 includes a vacuum tube 40, e. g., a triode, connected at the anode to B+ and at the cathode to ground through a relay coil 41 having a normally closed contactor 41–1 and a normally open contactor 41–2. A capacitor 42 is connected to ground and through a charging resistor 43 to B+. The grid of tube 40 is connected to terminal 29 of deck 18 and is connected through a resistor 44 and normally closed contactor 41–1 to a juncture 45 located between capacitor 42 and charging resistor 43. Thus as the charge on capacitor 42 increases to the B+ potential through resistor 43, the potential on the control grid of tube 40 raises concurrently through normally closed contactor 41–1 and resistor 44. When the potential on the aforesaid control grid is increased a sufficient amount tube 40 becomes conductive causing current to be drawn through the cathode circuit and energize relay coil 41. Energized relay coil 41 opens normally closed contactor 41–1 and closes normally open contactor 41–2 coupled between juncture 45 and stepping switch solenoid 21. The instant contactor 41–2 is closed capacitor 42 discharges through stepping switch solenoid 21 which actuates stepper 22 causing switch arms 19, 20 to rotate to terminals 25, 31 of decks 17, 18, respectively, thereby connecting tube 7 into the circuit for testing.

It will be noted that capacitor 42 is allowed to completely discharge by the provision of a parallel combination of a grid resistor 46 and grid capicitor 47 connected between the grid of tube 40 and ground to provide an operating bias on the grid of tube 40 below the normal cutoff voltage of such tube. After cutoff of tube 40 relay coil 41 ceases to be energized causing normally closed contactor 41–1 to close and normally open contactor 41–2 to open, whereupon relaxation oscillator 39 repeats the previously described cycle. The relaxation oscillator cycle repeats at a predetermined frequency controlled by the characteristics of the electrical components of oscillator 39. After stepping switch 16 has rotated switch arms 19 and 20 through the individual terminals on decks 17 and 18 as difference amplifier 15 sequentially checks the series of tubes 6, 7, 8, 9 at a continuous cyclic rate, switch arms 19, 20 return to starting terminals 23, 29 on decks 17, 18, respectively, at which time the grid of tube 40 is grounded through terminal 29 causing the tube tester of the invention to become inactivated as described more fully hereinafter.

When the tube being tested, as tube 6 for example, operates outside the standard deviation set by resistor 37, difference amplifier tube 15 is unbalanced and relaxation oscillator 39 is inactivated through a switch mechanism now to be described.

Such a switch mechanism includes a relay coil 48 having a first normally open contactor 48–1 and a second normally open contactor 48–2. One side of relay coil 48 is connected in series with the contactor 38–1 to one terminal of an A. C. power source 49, and the other side of relay coil 48 is connected in series with a first normally closed contactor 50–1 of a double pole reset switch 50 to the other terminal of A. C. power source 49. Contactor 48–1 is connected in parallel with contactor 38–1. One side of contactor 48–2 is connected to ground and the other side is connected in series with contactor 50–2 to the grid of tube 40. A visual indicator is provided by a reject light 51 connected in parallel with relay coil 48.

Manual control of the tube tester of the invention is provided by a switch 52 having the "on" position terminal located between contactor 50–2 and terminal 29 of deck 18, and the "off" position terminal located between contactor 50–2 and ground.

During operation should a defective tube be present, as tube 6 for example, an abnormal voltage is applied to the right hand control grid of difference amplifier tube 15 through switch arm 19 in contact with terminal 24 of deck 17 while standard tube 5 applies a reference voltage to the left hand control grid of difference amplifier tube 15 causing a voltage proportional to the difference of the aforesaid unbalanced grid voltages of sufficient magnitude to develop across the anodes of tube 15 to energize relay coil 38. Energized relay coil 38 closes contactor 38–1 causing current from A. C. source 49 to flow through relay coil 48 which simultaneously closes contactors 48–1 and 48–2 immediately inactivating relaxation oscillator 39 by grounding the grid of tube 40 thereof. Current is concurrently drawn through reject light 51 indicating the presence of a defective tube while the positive identification of such defective tube is shown on deck 18. Defective tube 6 may then be replaced. After replacement of the aforesaid defective tube, difference amplifier tube 15 is again in balance releasing relay 38 and causing contactor 48–1 to open.

It will be found that relaxation oscillator 39 is maintained inactive by the provision of contactor 48–1 which remains closed allowing current flow through relay 48 even after the defective tube is replaced and contactor 38–1 is opened. Supervisory control of relaxation oscillator 39 is provided by reset switch 50. To start relaxation oscillator 39 in operation again and continue checking the remainder of the series of tubes 7, 8, 9, etc., reset switch 50 is depressed momentarily holding contactors 50–1 and 50–2 open whereby relay coil 48 is deenergized to open contactors 48–1 and 48–2 simultaneously. Relaxation oscillator 39 will continue to operate until either another defective tube is checked or until the last tube of the series is checked after which stepper 22 rotates switch arms 19 and 20 around to the starting terminals 23 and 29 respectively, at which time the grid of tube 40 connected to terminal 29 of deck 18 is grounded by switch arm 20 and the oscillator rendered inoperative to halt testing.

Intermediate inactivation of the tube tester during any cycle of operation can be obtained by manually turning switch 52 off.

To start the tube tester from the normal starting position, i. e., grounded switch arm 20 positioned on terminal 29, switch 52 is turned on and the grid of the tube 40 is momentarily released from ground by depressing reset switch 50 which opens contactor 50–2 just long enough to allow relaxation oscillator 39 to deliver a pulse to stepping switch solenoid 21 causing stepper 22 to rotate switch arms 17 and 18 to terminals 23 and 30, respectively, and connect the first tube of the series, i. e., tube 6, into the circuit. The series of tubes 6, 7, 8, 9, etc. are then checked as hereinbefore described.

Various metering devices may be connected into the tube tester circuit for measuring tube characteristics, as for example, an ammeter 53 having one terminal connected to ground and the other terminal connected in series with a resistor 54 to switch arm 19 of deck 17.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. A tube testing apparatus for sequentially comparing a series of tubes in service with a standard tube comprising a stepping switch having terminals connected each to a different one of said series of tubes, a difference amplifier connected to said standard tube and said stepping switch, a relaxation oscillator intermittently energizing said switch for sequentially connecting a different one of said series of tubes through said terminals to said difference amplifier, and a switch mechanism connected between said difference amplifier and said relaxation oscillator for inactivating said relaxation oscillator when the output signal of one of said series of tubes differs from the output signal of said standard tube.

2. A tube testing apparatus for sequentially comparing a series of tubes in service with a standard tube comprising a stepping switch having terminals connected each to a different one of said series of tubes, a difference amplifier connected to said standard tube and said stepping switch for producing an output signal upon the receipt of unbalanced input signals, a relaxation oscillator intermittently energizing said switch for sequentially connecting a different one of said terminals to said difference amplifier, a switch mechanism including a relay connected to said relaxation oscillator, and said relay being coupled to said difference amplifier and responsive to said output signal for discriminately causing said switch mechanism to inactivate said relaxation oscillator.

3. A tube testing apparatus for sequentially comparing a series of tubes in service with a standard tube comprising a stepping switch having terminals connected each to the cathode of a different one of said series of tubes, a difference amplifier having a first grid coupled to the cathode of said standard tube and a second grid coupled to said stepping switch for producing an output signal when the input signal from one of said series of tubes differs from the input signal from said standard tube, a relaxation oscillator intermittently activating said switch for sequentially connecting at a continuous cyclic rate a different one of said terminals to said difference amplifier, a D. C. power supply means for energizing said oscillator, a switch mechanism connected to control inactivation of said oscillator, said switch mechanism having a control means coupled to the plates of said difference amplifier responsive to said output signal for discriminately inactivating said relaxation oscillator, and visual indicator means connected to said switch mechanism for indicating the existence and identification of a defective tube in said series of tubes.

4. A tube testing apparatus for sequentially comparing a series of tubes in service with a standard tube comprising a double deck stepping switch having first and second electrically independent contact decks with first and second mechanically coupled rotating switch arms, said first contact deck having a plurality of terminals connected each to the cathode of a different one of said series of tubes, a double triode having a first grid coupled to the cathode of said standard tube and a second grid coupled to said first rotating switch arm for producing an output signal when the input signal impressed on said first grid differs from the input signal impressed on said second grid, a relaxation oscillator intermittently activating said switch for rotating said switch arms sequentially through said terminals connecting at a continuous cyclic rate a different one of said series of tubes to said double triode, electrical means energizing said relaxation oscillator, a switch mechanism arranged to discriminately inactivate said relaxation oscillator during existence of a defect in one of said series of tubes, said switch mechanism having a control means coupled to the plates of said double triode responsive to said output signal, and visual indicator means connected to said switch mechanism for indicating the existence and identification of a defective tube in said series of tubes.

5. A tube testing apparatus as described in claim 4 wherein said relaxation oscillator comprises a vacuum tube including a grid, a first resistor connected to the anode of said tube, a first capacitor connected in series with said first resistor and ground, a second resistor connected to said grid, a third resistor connected between said grid and ground, a second capacitor connected in parallel with said third resistor, and a relay coil having a normally closed contactor and a normally open contactor, said relay coil connected between the cathode of said tube and ground, said normally closed contactor coupled between said second resistor and said first capacitor, and normally open contactor connected in series with said normally closed contactor and to said first capacitor.

6. A tube testing apparatus as described in claim 4 wherein said switch mechanism comprises an A. C. power supply, a relay having a solenoid and a normally open contactor, said switch mechanism control means having a contactor connected in parallel with the contactor of said relay and connecting said relay solenoid across said A. C. power supply, and a reject light connected in parallel with said solenoid of said first relay.

7. A tube testing apparatus for sequentially comparing a series of tubes in service with a standard tube comprising a stepping switch having terminals connected each to the cathode of a different one of said series of tubes; a difference amplifier having a first grid coupled to the cathode of said standard tube and a second grid coupled to said stepping switch for producing an output signal when the input signal impressed on said first grid differs from the input signal impressed on said second grid; a relaxation oscillator comprising a vacuum tube including a grid, a D. C. power supply connected to the anode of said tube, a first resistor connected to said power supply, a first capacitor connected in series with said first resistor and ground, a second resistor connected to said grid, a third resistor connected between said grid and ground, a second capacitor connected in parallel with said third resistor, a relay coil having a normally closed contactor and a normally open contactor with said relay coil connected between the cathode of said vacuum tube and ground, said normally closed contactor coupled between said second resistor and said first capacitor, and said normally open contactor connected between said first capacitor and said stepping switch in series with said normally closed contactor, whereby said relaxation oscillator intermittently activates said stepping switch for sequentially connecting at a continuous cyclic rate a different one of said terminals to said difference amplifier; a switch mechanism comprising an A. C. power supply, a first relay having a solenoid and first and second normally open contactors with said solenoid connected across the terminals of said A. C. power supply, a second relay including a solenoid and a normally open contactor with the solenoid thereof connected across the anodes of said difference amplifier to receive said output signal therefrom, and the contactor thereof connected in parallel with the contactor of said first relay between one terminal of said A. C. power supply and said solenoid of said first relay, said second contactor of said second relay connected between the grid of said relaxation oscillator vacuum tube and ground, and a reject light connected in parallel with the solenoid of said first relay.

8. A tube testing apparatus for sequentially comparing a series of tubes in service with a standard tube comprising a double deck stepping switch having first and second electrically independent contact decks with first and second mechanically coupled rotating switch arms, said second switch arm coupled to ground, a solenoid driven stepper for rotating said switch arms, said first contact deck having a plurality of terminals connected each to the cathode of a different one of said series of tubes; a double triode vacuum tube having a first grid coupled to the cathode of said standard tube and a second grid coupled to said first rotating switch arm for producing an output signal when the input signals to said tube are unequal; a relaxation oscillator comprising a vacuum tube having an anode connected to a D. C. power supply and a grid having a first resistor connected thereto, a relay having a coil connected between the cathode of said tube and ground and normally closed and normally open contactors connected in named order between said grid resistor and said switch solenoid, a second resistor connector to said power supply, and a capacitor connected between ground and said second resistor at the juncture of said relay contactors, a switch mechanism for inactivating said relaxation oscillator comprising an A. C. power supply, a first relay having a solenoid and first and second normally open contactors with said solenoid connected across the terminals of said A. C. power supply, a second relay including a solenoid and normally open contactor with the solenoid thereof coupled across the plates of said double triode and responsive to the output signal thereof, said first contactor of said first relay and said contactor of said second relay connected in parallel between a first terminal of said A. C. power supply and said solenoid of said first relay, said second contactor of said first relay connected between said vacuum tube of said relaxation oscillator and ground, and a reject light connected in parallel with said solenoid of first relay; a double pole reset switch having a first contactor connected between the grid of said relaxation oscillator vacuum tube and said second contactor of said second relay, and said reset switch having a second contactor connected between a second terminal of said A. C. power supply and said solenoid of said second relay; and a manual switch having an "off" position terminal located between ground and said first contactor of said reset switch and an "on" position terminal located between said first contactor of reset switch and a terminal on said second contact deck of said stepping switch.

References Cited in the file of this patent
UNITED STATES PATENTS

| | | |
|---|---|---|
| 2,468,398 | Griffin | Apr. 26, 1949 |
| 2,478,750 | De Muth | Aug. 9, 1949 |